(12) United States Patent
Mochinaga et al.

(10) Patent No.: US 8,420,990 B2
(45) Date of Patent: Apr. 16, 2013

(54) INDUCTION HEATING APPARATUS AND INDUCTION HEATING METHOD

(75) Inventors: Hiroaki Mochinaga, Tokyo (JP); Kazunari Ishizaki, Kitakyushu (JP); Shigenobu Koga, Tokyo (JP); Takaharu Kataoka, Tokyo (JP); Kenji Umetsu, Tokyo (JP); Yasuo Matsunaga, Suzuka (JP); Yasuyuki Ikeda, Suzuka (JP)

(73) Assignees: Nippon Steel & Sumitomo Metal Corporation, Tokyo (JP); Fuji Electric Co., Ltd., Kawasaki-Shi (JP)

( * ) Notice: Subject to any disclaimer, the term of this patent is extended or adjusted under 35 U.S.C. 154(b) by 246 days.

(21) Appl. No.: 12/918,555

(22) PCT Filed: Mar. 12, 2009

(86) PCT No.: PCT/JP2009/054734
§ 371 (c)(1),
(2), (4) Date: Aug. 20, 2010

(87) PCT Pub. No.: WO2009/125645
PCT Pub. Date: Oct. 15, 2009

(65) Prior Publication Data
US 2010/0326984 A1  Dec. 30, 2010

(30) Foreign Application Priority Data
Apr. 9, 2008 (JP) .................................. 2008-101622

(51) Int. Cl.
*H05B 6/04* (2006.01)
(52) U.S. Cl.
USPC ............................ 219/662; 219/646; 219/674

(58) Field of Classification Search .................. 219/630, 219/637, 645, 662, 674, 635, 636, 646, 660
See application file for complete search history.

(56) References Cited

U.S. PATENT DOCUMENTS 4,357,512 A * 11/1982 Nishimoto et al. ........... 219/608
4,456,803 A *  6/1984 Kaneda et al. ................ 219/612
4,778,971 A * 10/1988 Sakimoto et al. ............. 219/645

(Continued)

FOREIGN PATENT DOCUMENTS

JP       56-106388 A     8/1981
JP        3-26094 U     3/1991

(Continued)

OTHER PUBLICATIONS

International Search Report for PCT/JP2009/054734 mailed Jun. 9, 2009.

*Primary Examiner* — William F Kraig
(74) *Attorney, Agent, or Firm* — Birch, Stewart, Kolasch & Birch, LLP

(57) ABSTRACT

There is provided an induction heating apparatus which continuously heats a steel plate using a solenoid system. The induction heating apparatus (1) includes: at least three heating coils (10A to 10D) disposed along a longitudinal direction of the steel plate to make the steel plate (2) pass through an inside thereof; and inductance adjusters (12A to 12D) disposed on electrical pathways (11) electrically connecting each of the heating coils and a power source applying a voltage to each of the heating coils and capable of generating self-induction and adjusting self-inductance in the self-induction, in which each of the inductance adjusters is disposed to cause a generation of mutual induction at least between the inductance adjusters mutually adjacent to one another.

13 Claims, 11 Drawing Sheets

U.S. PATENT DOCUMENTS

| | | | |
|---|---|---|---|
| 5,126,522 A * | 6/1992 | Katayama et al. | 219/663 |
| 6,570,141 B2 * | 5/2003 | Ross | 219/645 |
| 6,930,292 B1 * | 8/2005 | Winther et al. | 219/635 |
| 7,183,526 B2 * | 2/2007 | Yoshino et al. | 219/635 |
| 7,671,307 B2 * | 3/2010 | Nikanorov et al. | 219/645 |
| 2008/0264932 A1 * | 10/2008 | Hirota | 219/672 |
| 2010/0108665 A1 * | 5/2010 | Hirota | 219/600 |
| 2010/0155390 A1 * | 6/2010 | Hirota | 219/645 |

FOREIGN PATENT DOCUMENTS

| | | |
|---|---|---|
| JP | 11-257850 A | 9/1999 |
| JP | 2000-100552 A | 4/2000 |
| JP | 2001-21270 A | 1/2001 |
| JP | 2003-243137 A | 8/2003 |
| JP | 2004-259665 A | 9/2004 |
| JP | 2005-206906 A | 8/2005 |
| JP | 2007-12482 A | 1/2007 |

* cited by examiner

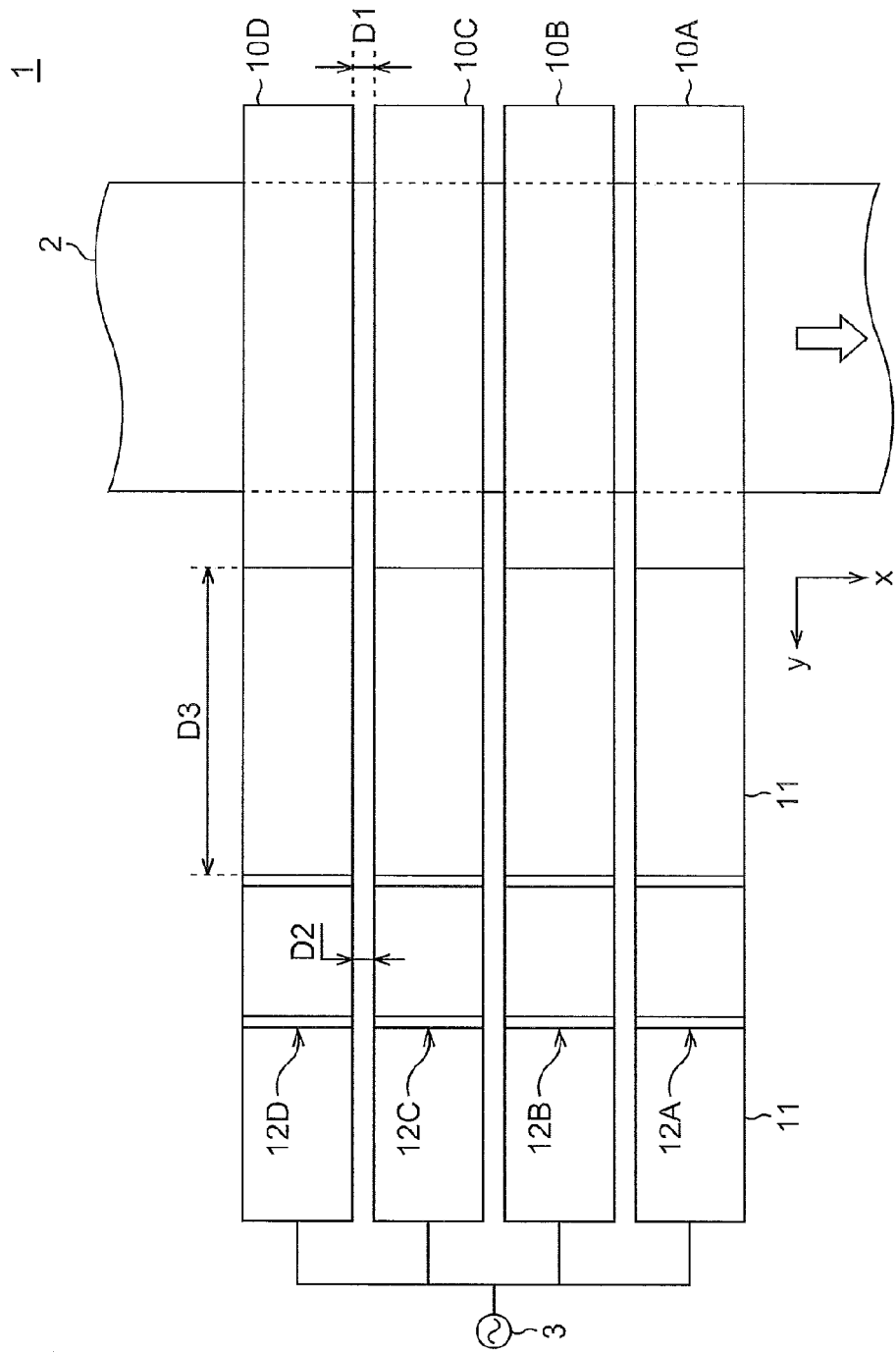

INDUCTION HEATING APPARATUS AND INDUCTION HEATING METHOD

TECHNICAL FIELD

The present invention relates to an induction heating apparatus and an induction heating method.

BACKGROUND ART

When manufacturing a steel plate and the like, a heating of the steel plate is conducted in various places such as, for instance, an annealing furnace and an alloying furnace for plating, and when a coated steel plate is dried. As a heating method of the steel plate, a gas heating, a trans-induction heating and the like, for instance, can be cited. For example, the gas heating is often employed in an annealing furnace, and the trans-induction heating, which can be used for a heating before plating, is mainly employed in an alloying furnace for plating, when drying a coated steel plate, and the like.

Meanwhile, an induction heating method can be largely divided into a solenoid system (axial direction magnetic flux heating) and a transverse system (transverse magnetic flux heating) or the like. In the solenoid system, a steel plate is heated by applying, to the plate, a magnetic flux along a longitudinal direction of the steel plate. In the transverse system, a steel plate is heated by applying, to the plate, a magnetic flux along a direction penetrating the steel plate. An induction heating method of transverse system is normally employed to heat a nonmagnetic material, and as a heating of a steel plate, an induction heating method of solenoid system is mainly employed. As the induction heating method of solenoid system, methods as disclosed in Patent Documents 1 and 2, for instance, have been conventionally known.

In the induction heating method of Patent Document 1, series variable capacitors are provided for respective heating coils used for the induction heating to equalize an amount of current flowing through the respective heating coils. However, in such a method, if a high-frequency alternating voltage of 50 kHz or the like, for example, is applied to the heating coils, capacitive reactance values in the series variable capacitors are reduced, so that series variable capacitors with larger capacities are required for appropriately controlling the amount of current. Meanwhile, when a steel plate is heated to a high temperature range in the vicinity of the Curie point, for instance, or when a heating rate is increased, there is a need to flow a large current through heating coils, to increase a frequency of an applied voltage and the like, for example. However, in the induction heating method of Patent Document 1, it is not possible to apply a high-frequency voltage because of the above-described reason, and accordingly, the amount of current has to be increased. It is difficult to design an entire apparatus to enable to flow a large current, and thus it has been difficult to heat a steel plate to a high temperature range and the like, for instance.

Meanwhile, in the induction heating method of Patent Document 2, two or more of single-turn coils are disposed along a longitudinal direction of a steel plate, in which a magnetizing force of the heating coil at a last stage is set to be one to ten times of a magnetizing force of the heating coil at a first stage. According to the induction heating method of Patent Document 2, it is possible to heat the steel plate to a high temperature range in the vicinity of the Curie point, and to reduce a decrease in a rate of heating in the vicinity of the Curie point. Note that the decrease in the rate of heating is reduced in the induction heating method of Patent Document 2 because the decrease in the rate of heating at the time of heating the steel plate causes ambiguous recrystallization behavior, interface control and the like, for instance, which makes it difficult to realize an optimum quality. However, in the induction heating method of Patent Document 2, variable resistors are inserted between the respective heating coils and a power source, and values of the variable resistors are changed to control the magnetizing force of each of the heating coils. Therefore, according to the induction heating method of Patent Document 2, the Joule heat is generated in the variable resistors, which causes a large energy loss (heat generation loss). Accordingly, although this may be acceptable in a case where a small current is flown, since a large current of, for instance, 4500 A is flown when heating a steel plate, such energy loss becomes large, and a large current has to be additionally flown through the heating coils in accordance with the energy loss, and it is further desired to improve an energy efficiency. Further, also in the induction heating method of Patent Document 2, it is difficult to completely keep the rate of heating constant since a magnetomotive force of the heating coil can be adjusted only by the resistance value of the variable resistor and a frequency of current flown through the heating coil, and an induction heating method capable of further reducing the decrease in the rate of heating is also desired.

Further, also in another method such as a method of controlling a final heating temperature to control the rate of heating and a method of adjusting the rate of heating, a control of a final heating rate and a mean value of the rate of heating was only conducted. Meanwhile, in a conventional manufacturing process of an alloying hot-dip galvanized steel plate, a heating furnace for heating for alloying has a long total length of, for instance, about 5 to 10 m, and with the use the heating method of controlling the mean value as described above, it was difficult to keep the rate of heating until a plating bath temperature reaches a final heating temperature constant, not only in a high temperature range in the vicinity of the Curie point. It is important to keep the rate of heating constant to strictly control an alloy structure, and also from that reason, an induction heating method capable of keeping the rate of heating constant is desired.

Patent Document 1: Japanese Patent Application Laid-open No. 2003-243137
Patent Document 2: Japanese Patent Application Laid-open No. 2005-206906
Patent Document 3: Japanese Patent Application Laid-open No. 2001-21270
Patent Document 4: Japanese Patent Application Laid-open No. H11-257850

SUMMARY OF THE INVENTION

Accordingly, the present invention has been made in view of the aforementioned problems, and an object thereof is to reduce, in an induction heating apparatus and an induction heating method of solenoid system, a change in a rate of heating for heating a steel plate while improving an energy efficiency.

In order to solve the aforementioned problems, according to a certain aspect of the present invention, there is provided an induction heating apparatus which continuously heats a steel plate using a solenoid system, the apparatus includes: at least three heating coils disposed along a longitudinal direction of the steel plate to make the steel plate pass through an inside thereof; and inductance adjusters disposed on electrical pathways electrically connecting each of the heating coils and a power source applying a voltage to each of the heating coils and capable of generating self-induction and adjusting self-inductance in the self-induction, the inductance adjuster being provided to each of the heating coils, in which each of the inductance adjusters is disposed to cause a generation of mutual induction at least between the inductance adjusters mutually adjacent to one another.

Note that the number of heating coils indicates the number of heating coils electrically branched in parallel from one power source.

With such a structure, heating densities of the steel plate generated by the mutually adjacent heating coils can be overlapped. By adjusting the self-inductance of the inductance adjusters, it is possible to adjust the voltage applied to the at least three heating coils. Further, with the use of mutual inductance between the mutually adjacent inductance adjusters, it is possible to synergistically increase an effect of inductance adjustment.

Further, it is also possible that the self-inductance generated by each of the inductance adjusters for the heating coil at a first stage and the heating coil at a last stage in the longitudinal direction of the steel plate is adjusted to be smaller than the self-inductance generated by the inductance adjuster for the heating coil disposed between the heating coil at the first stage and the heating coil at the last stage.

Further, it is also possible that a mutual distance of the heating coils mutually adjacent to one another is not less than $1/10$ nor more than $1/3$ of an inside diameter in a height direction of the heating coil, each of the inductance adjusters is structured by forming bypassed paths in a direction orthogonal to the electrical pathway, and a space between the mutually adjacent inductance adjusters is 50 mm to 500 mm.

Further, it is also possible that each of the inductance adjusters generates the self-induction by bypassing the electrical pathway on which each of the inductance adjusters is disposed in a substantially coil shape, and adjusts the self-inductance in the self-induction by changing a cross-sectional area of an area surrounded by the substantially coil-shaped bypassed paths being the bypassed electrical pathway.

Further, it is also possible that each of the electrical pathways connecting each of the heating coils and the power source is formed of a pair of input/output terminals longly extended from each of the heating coils, and the inductance adjuster is formed by bypassing the pair of input/output terminals to make one of the pair of input/output terminals and the other terminal separate from each other, and changes the cross-sectional area of the area surrounded by the bypassed paths by changing a distance between the one of the pair of input/output terminals and the other terminal in the bypassed paths.

Further, it is also possible that a space between each of the heating coils and each of the inductance adjusters connected to each of the heating coils is 500 mm to 2000 mm.

Further, it is also possible that each of the heating coils is a single-turn coil or a double-turn coil.

Further, in order to solve the aforementioned problems, according to another aspect of the present invention, there is provided an induction heating method for continuously heating a steel plate using a solenoid system, the method includes: disposing at least three heating coils along a longitudinal direction of the steel plate to make the steel plate pass through an inside of the coils; disposing inductance adjusters capable of generating self-induction and adjusting self-inductance in the self-induction on electrical pathways electrically connecting each of the heating coils and a power source applying a voltage to each of the heating coils, with respect to the respective heating coils, to cause a generation of mutual induction at least between the inductance adjusters mutually adjacent to one another; and adjusting the self-inductance generated by each of the inductance adjusters provided to the heating coil at a first stage and the heating coil at a last stage in the longitudinal direction of the steel plate to be smaller than the self-inductance generated by the inductance adjuster for the heating coil disposed between the heating coil at the first stage and the heating coil at the last stage.

Further, it is also possible that a mutual distance of the heating coils mutually adjacent to one another is not less than $1/10$ nor more than $1/3$ of an inside diameter in a height direction of the heating coil, each of the inductance adjusters is structured by forming bypassed paths in a direction orthogonal to the electrical pathway, and a space between the mutually adjacent inductance adjusters is 50 mm to 500 mm.

Further, it is also possible that each of the inductance adjusters generates the self-induction by bypassing the electrical pathway on which each of the inductance adjusters is disposed in a substantially coil shape, and adjusts the self-inductance in the self-induction by changing a cross-sectional area of an area surrounded by the substantially coil-shaped bypassed paths being the bypassed electrical pathway.

Further, it is also possible that each of the electrical pathways connecting each of the heating coils and the power source is formed of a pair of input/output terminals longly extended from each of the heating coils, and the inductance adjuster is formed by bypassing the pair of input/output terminals to make one of the pair of input/output terminals and the other terminal separate from each other, and changes the cross-sectional area of the area surrounded by the bypassed paths by changing a distance between the one of the pair of input/output terminals and the other terminal in the bypassed paths.

Further, it is also possible that a space between each of the heating coils and each of the inductance adjusters connected to each of the heating coils is 500 mm to 2000 mm.

Further, it is also possible that each of the heating coils is a single-turn coil or a double-turn coil.

BRIEF DESCRIPTION OF THE DRAWINGS

FIG. 3 is a top view in which the induction heating apparatus according the same embodiment is seen from above;

DETAILED DESCRIPTION OF THE PREFERRED EMBODIMENTS

Figure 1:
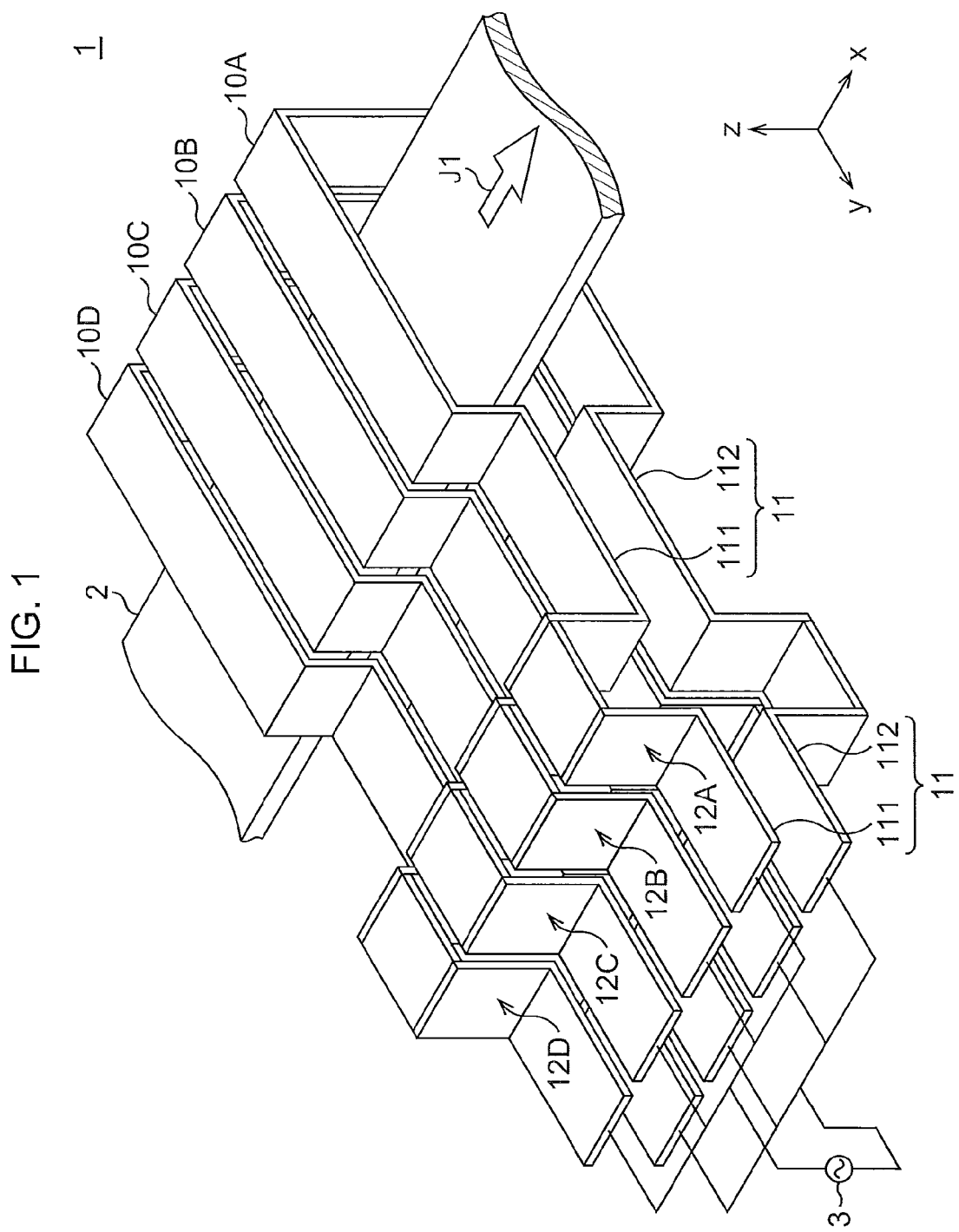
FIG. 1 is a perspective view showing an induction heating apparatus according to a first embodiment of the present invention.

Hereinafter, preferred embodiments of the present invention will be described in detail with reference to the attached drawings. Note that in the present specification and the drawings, components having practically the same functional configuration are denoted by the same reference numerals to omit repeated explanation.

<Structure of Induction Heating Apparatus>

Figure 2:
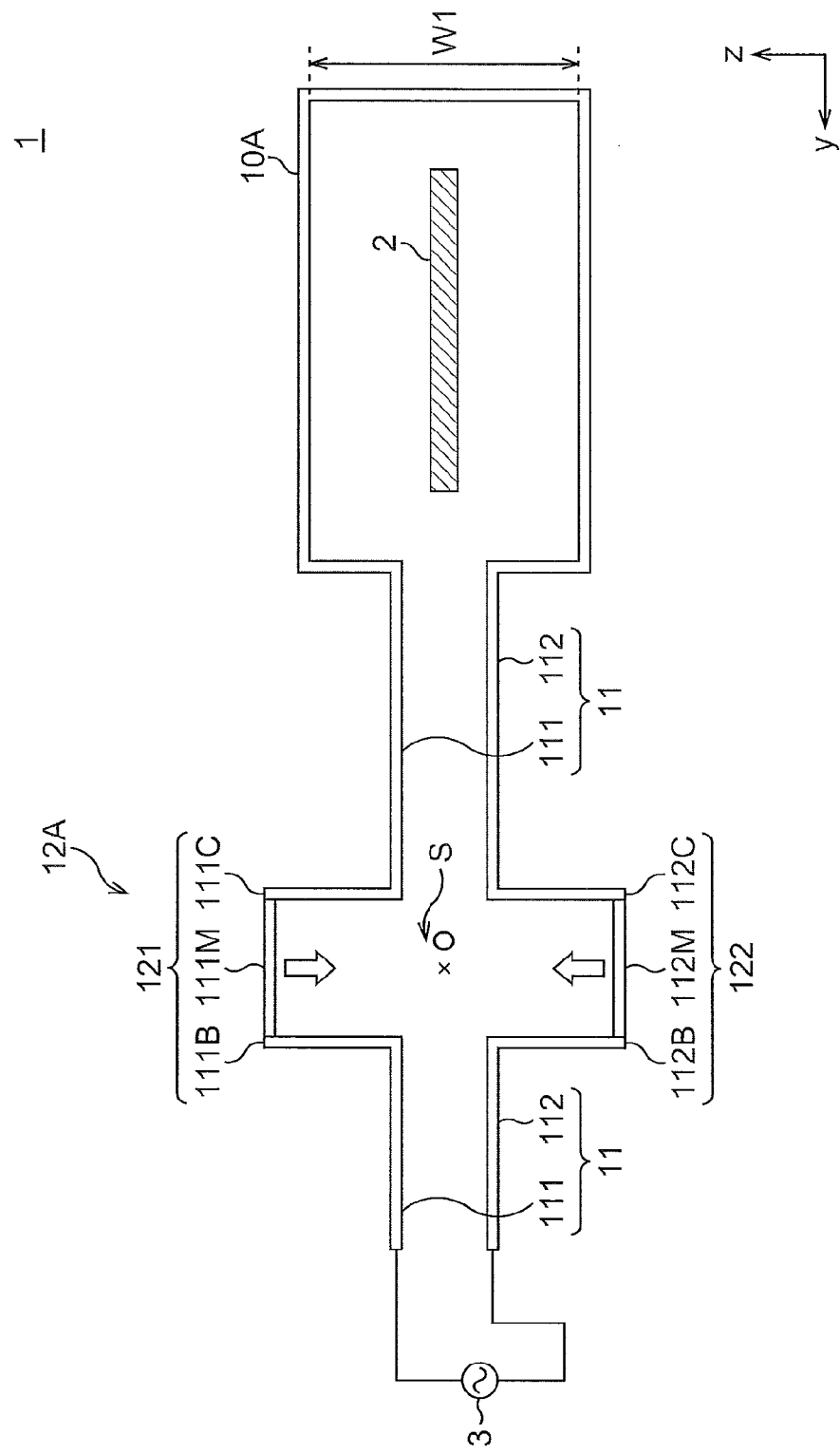
FIG. 2 is a side view in which the induction heating apparatus according to the same embodiment is seen from a plate-passing direction of a steel plate.

First, a structure of an induction heating apparatus according to a first embodiment of the present invention will be described with reference to FIG. 1 to FIG. 3. FIG. 1 is a perspective view showing the induction heating apparatus according to the first embodiment of the present invention, FIG. 2 is a side view in which the induction heating apparatus according to the present embodiment is seen from a plate-passing direction of a steel plate, and FIG. 3 is a top view in which the induction heating apparatus according the present embodiment is seen from above.

An induction heating apparatus 1 according to the present embodiment includes heating coils 10A to 10D, electrical pathways 11, and L adjusters 12A to 12D. Accordingly, respective structures of these components will be first described hereinafter.

The induction heating apparatus 1 according to the present embodiment heats, using a solenoid system, a steel plate 2 which is passed in a plate-passing direction J1. The solenoid system (axial direction magnetic flux heating) is a system of induction heating in which a magnetic flux directed in a substantially longitudinal direction (axial direction, x-axis direction) of an object to be heated (steel plate 2, for instance) is generated inside the object to be heated, an eddy current is generated inside the object to be heated by changing the magnetic flux, and the object to be heated is heated using the Joule heat of the eddy current.

(Heating Coil)

In order to generate the aforementioned magnetic flux in the longitudinal direction of the steel plate 2, the induction heating apparatus 1 includes at least three or more of heating coils disposed to surround the steel plate 2, as shown in FIG. 1 and FIG. 2. Note that in the present embodiment, a case in which the induction heating apparatus 1 includes four heating coils 10A to 10D will be described for convenience of explanation. However, the number of heating coils is not limited to four, and if three or more of, other than four, heating coils are provided, the induction heating apparatus 1 includes the other structures whose number corresponds to that of the heating coils.

As shown in FIG. 3, each of the heating coils 10A to 10D is formed to surround the steel plate 2 to make the steel plate 2 pass through an inside thereof, and is disposed along the longitudinal direction (x-axis direction) of the steel plate 2. In other words, the heating coils 10A to 10D are disposed to be arranged so that their forming surfaces forming the coils become substantially parallel to one another and center points of the forming surfaces position on substantially the same line. At this time, if the respective heating coils 10A to 10D are disposed to make the steel plate 2 pass through the center points of the coil forming surfaces of the heating coils 10A to 10D, a heating efficiency can be increased.

(Overlapping of Heating Densities)

Further, each of the heating coils 10A to 10D is disposed so that a mutual distance D1 of the mutually adjacent heating coils 10A to 10D becomes not less than 1/10 times nor more than 1/3 times of an inside diameter W1 in a height direction of the heating coils 10A to 10D. As above, by setting the mutual distance D1 of the mutually adjacent heating coils 10A to 10D to be not less than 1/10 nor more than 1/3 of the inside diameter W1 in the height direction of the heating coils 10A to 10D, the respective heating coils 10A to 10D can keep a heating rate of the steel plate 2 constant and increase the heating efficiency. Therefore, with this structure, it is possible to compensate a lack of heating amount due to a magnetic permeability of the steel plate 2 which is decreased in the vicinity of the Curie point, by heating areas of the approximated heating coils 10A to 10D.

Further, according to the aforementioned structure, mutual inductance is generated between the respective heating coils 10A to 10D, and it is possible to synergistically increase an influence of the mutual inductance. Specifically, it is possible to increase a current flowing through the heating coils 10A, 10D disposed at end portions (heating coils at a first stage and a last stage). This is because, since inductance in the center heating coils 10B, 10C is increased as a result of approximating the heating coils 10A to 10D, inductance in the heating coils 10A, 10D at the end portions is relatively decreased. Further, with the use of such mutual inductance, it is possible to set the heating rate in the heating coil 10A at the last stage (and the heating coil 10D at the first stage) to be greater than the heating rate in the other heating coils 10B, 10C. Therefore, the heating rate of the steel plate 2 heated to the vicinity of the Curie point can be increased at the last stage.

Note that if the mutual distance D1 of the mutually adjacent heating coils 10A to 10D is set to be less than 1/10 of the inside diameter W1 in the height direction of the heating coils 10A to 10D, when a high-frequency alternating voltage is applied, a discharge may occur between the mutually adjacent heating coils 10A to 10D. Further, as will be described hereinbelow, a voltage applied to the heating coils 10A to 10D can be adjusted for each of the coils by the L adjusters 12A to 12D to be described below, so that a potential difference, other than a potential difference ascribable to the coils themselves, is also generated among the coils. Accordingly, such a potential difference may also lead to an occurrence of discharge. Therefore, it is preferable that the mutual distance D1 of the mutually adjacent heating coils 10A to 10D is equal to or more than 1/10 of the inside diameter W1 in the height direction of the heating coils 10A to 10D. Further, if the mutual distance D1 of the mutually adjacent heating coils 10A to 10D is set to be more than 1/3 of the inside diameter W1 in the height direction of the heating coils 10A to 10D, the heating efficiency of the mutually adjacent heating coils 10A to 10D cannot be increased. The heating of the steel plate 2 by setting the mutual distance D1 of the mutually adjacent heating coils 10A to 10D to be equal to or less than ⅓ of the inside diameter W1 in the height direction of the heating coil will be schematically described with reference to FIG. 4.

Figure 4A:
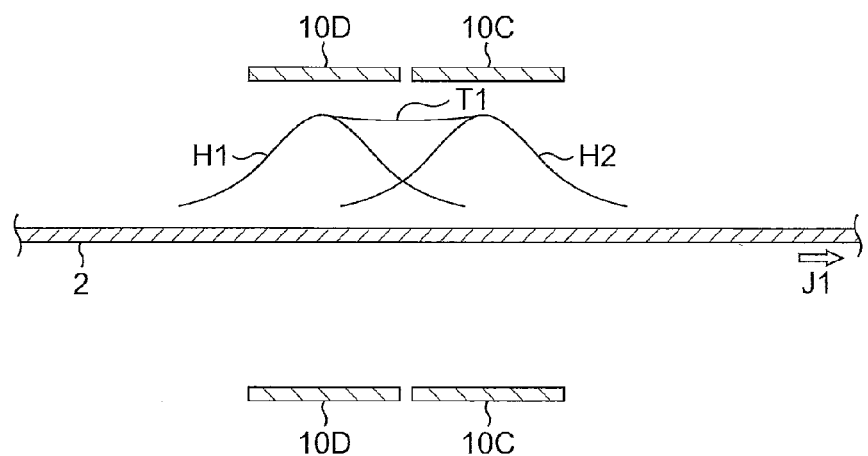
FIG. 4A is an explanatory diagram for explaining heating densities on the steel plate generated by heating coils in the induction heating apparatus according to the same embodiment, and is a view showing a case where a mutual distance of mutually adjacent heating coils is set to be not less than $1/10$ nor more than $1/3$ of an inside diameter W1 in a height direction of the heating coil.
Figure 4B:
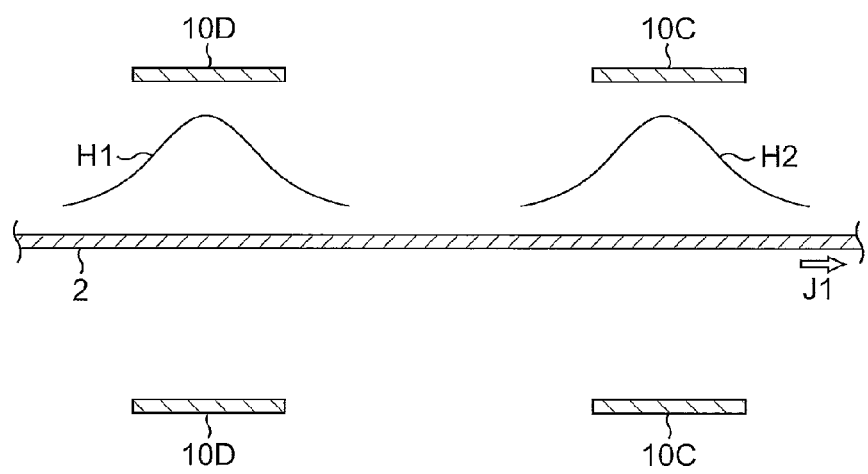
FIG. 4B is an explanatory diagram for explaining heating densities on a steel plate generated by heating coils in an induction heating apparatus to be compared to the induction heating apparatus according to the same embodiment, and is a view showing a case where a width of a conducting wire of the coil is set constant and a mutual distance of mutually adjacent heating coils is set to be more than $1/3$ of an inside diameter in a height direction of the heating coil.

FIG. 4 are explanatory diagrams for explaining heating densities on the steel plate generated by the heating coils 10C, 10D in the induction heating apparatus according to the present embodiment. Concretely, FIG. 4A shows a case of the present embodiment, namely, a case where the mutual distance D1 of the mutually adjacent heating coils 10A to 10D is set to be not less than ⅒ nor more than ⅓ of the inside diameter W1 in the height direction of the heating coils 10A to 10D. FIG. 4B shows a case, to be compared with the case of the present embodiment, where a width of a conducting wire of the coil is set constant and the mutual distance D1 of the mutually adjacent heating coils 10A to 10D is set to be more than ⅓ of the inside diameter W1 in the height direction of the heating coils 10A to 10D.

As shown in FIG. 4A, if the mutual distance D1 of the mutually adjacent heating coils 10A to 10D is set to be not less than ⅒ nor more than ⅓ of the inside diameter W1 in the height direction of the heating coils 10A to 10D, a heating density (a unit thereof is "$Q/m^2$", the same applies hereinafter) H1 generated by the heating coil 10D and a heating density H2 generated by the heating coil 10C have substantially Gaussian distributions with respect to the longitudinal direction of the steel plate 2. Accordingly, since the heating coils 10C, 10D are disposed to be adjacent to each other to make the mutual distance D1 of the mutually adjacent heating coils 10A to 10D become not less than ⅒ nor more than ⅓ of the inside diameter W1 in the height direction of the heating coils 10A to 10D, skirts of the distributions of the heating density H1 and the heating density H2 are overlapped. Therefore, a heating density T1 at which the steel plate 2 is actually heated can maintain a high value, namely, it is possible to keep the rate of heating constant also between the heating coil 10D and the heating coil 10C. Further, it goes without saying that, if the mutual distance D1 of the mutually adjacent heating coils 10A to 10D is set to be more than ⅓ of the inside diameter W1 in the height direction of the heating coils 10A to 10D, the overlapping of the heating densities H1, H2 is of course eliminated and thus the constant rate of heating cannot be kept, as shown in FIG. 4B.

Note that in the present embodiment, the heating coils 10A to 10D are single-turn coils as shown in FIG. 1 and the like for convenience of explanation, but, they may also be double-turn coils.

(Electrical Pathway)

An alternating voltage is applied to the heating coils 10A to 10D from an AC power source 3. As terminals that apply the alternating voltage, electrical pathways 11 are extended to the respective heating coils 10A to 10D, and the alternating voltage from the AC power source 3 is applied to each of the electrical pathways 11. In other words, the electrical pathways 11 are input/output conducting wires used for electrically connecting the AC power source 3 and the respective heating coils 10A to 10D, applying the alternating voltage from the AC power source 3 to the respective heating coils 10A to 10D, and inputting/outputting a current to/from the AC power source 3.

The electrical pathway 11 is formed of a pair of input/output terminals 111, 112 longly extended from coil-shaped both end portions of each of the heating coils 10A to 10D. Further, each of the pair of input/output terminals 111, 112 is formed integrally with each of the heating coils 10A to 10D connected thereto. With this structure, as compared to a case where both the terminals and the heating coils are formed separately, it is possible to reduce an electrical resistance at a connected portion between each of the heating coils 10A to 10D and the pair of input/output terminals 111, 112 and increase the strength, and the manufacture can be simplified. However, it goes without saying that each of the heating coils 10A to 10D and the pair of input/output terminals 111, 112 can also be formed separately. Note that FIG. 1 and the like show a case where the heating coils 10A to 10D are formed of wide plate materials, and the pair of input/output terminals 111, 112 also have the same width as the heating coils 10A to 10D. Although the pair of input/output terminals 111, 112 are formed of the wide plate materials to increase a withstand current strength so that a large current can be flown therethrough, they are not necessarily formed of the plate materials.

Further, the pair of input/output terminals 111, 112 are extended in substantially parallel to each other. Further, it is preferable that each of the pair of input/output terminals 111, 112 (namely, each of the electrical pathways 11) is extended in substantially the same direction (y-axis direction) in substantially the same plane (in an xy plane) regardless of the respective heating coils 10A to 10D to which the input/output terminals are connected. With this structure, it is possible to downsize (miniaturize) the induction heating apparatus 1 and to form the respective heating coils 10A to 10D in the same shape, so that the manufacture is simplified.

(L Adjuster)

On respective electrical pathways of the electrical pathways 11 between the respective heating coils 10A to 10D and the AC power source 3, the L adjusters 12A to 12D are inserted to be disposed.

Each of the L adjusters 12A to 12D is an example of inductance adjuster capable of adjusting reactance in a circuit by adjusting self-inductance, and is formed by bypassing the electrical pathway 11 in a substantially coil shape. More concretely, in each of the L adjusters 12A to 12D, one input/output terminal 111 forming the electrical pathway 11 is bypassed in the upward direction (positive z-axis direction) and the other input/output terminal 112 is bypassed in the downward direction (negative z-axis direction) to separate the one input/output terminal 111 and the other input/output terminal 112 at a position on which each of the L adjusters 12A to 12D is disposed, as shown in FIG. 2. In other words, in each of the L adjusters 12A to 12D, the input/output terminals 111, 112 of the electrical pathway 11 are respectively bypassed in a substantially U shape. As a result of this, each of the L adjusters 12A to 12D forms an area S surrounded by bypassed paths 121, 122 formed by bypassing the input/output terminals 111, 112. The bypassed paths 121, 122 of the input/output terminals 111, 112 surrounding the area S form a substantially coil shape such as a shape of a single-turn coil. Each of the L adjusters 12A to 12D with such a structure has a substantially coil shape, so that it generates self-induction when an alternating current is flown from (when an alternating voltage is applied by) the AC power source 3.

With reference to FIG. 2, respective structural examples of the L adjusters 12A to 12D will be further concretely described by citing the L adjuster 12A as an example.

The L adjuster 12A includes standing portions 111C, 111B, 112C, 112B, and coupling portions 111M, 112M. The standing portion 111C is formed by bending the input/output terminal 111 extended from the heating coil 10A upward in a vertical direction (z-axis direction), and the standing portion 111B is formed by similarly bending the input/output terminal 111 to which the AC power source 3 is connected. Accordingly, the standing portion 111C and the standing portion 111B are provided in a substantially parallel manner. Further, the coupling portion 111M electrically connects the standing portion 111C and the standing portion 111B. The standing portions 111C, 111B and the coupling portion 111M form the bypassed path 121.

Meanwhile, the standing portion 112C is formed by bending the input/output terminal 112 extended from the heating coil 10A downward in a vertical direction (z-axis direction), and the standing portion 112B is formed by similarly bending the input/output terminal 112 to which the AC power source 3 is connected. Accordingly, the standing portion 112C and the standing portion 112B are provided in a substantially parallel manner. Further, the coupling portion 112M electrically connects the standing portion 112C and the standing portion 112B. The standing portions 112C, 112B and the coupling portion 112M form the bypassed path 122. Specifically, a space between the bypassed path 121 and the bypassed path 122 forms the area S, and by forming the area S, each of the L adjusters 12A to 12D forms a substantially coil shape to generate self-inductance in self-induction.

(Self-Inductance)

Further, each of the L adjusters 12A to 12D is formed to be capable of adjusting its own self-inductance. Concretely, each of the L adjusters 12A to 12D can adjust the self-inductance by changing a cross-sectional area of the area S surrounded by the bypassed paths 121, 122 (a projected area in a yz plane), namely, an area of a surface that forms the substantially coil shape. Note that the self-inductance of the coil is determined by, for example, the number of turns, a radius of coil, a length of coil, a diameter of conducting wire, a magnetic permeability of the periphery (magnetic permeability of a core, namely, the steel plate 2) and the like, so that the inductance of the coil can be adjusted by changing the cross-sectional area of the coil to change the radius of the coil and the like, for instance. Accordingly, each of the L adjusters 12A to 12D can adjust the self-inductance by changing the cross-sectional area of the area S. Therefore, it is possible to adjust a voltage applied to each of the heating coils 10A to 10D by adjusting reactance in a circuit using the L adjusters 12A to 12D. Accordingly, it is possible to adjust a heating amount of the steel plate 2 provided by the heating coils 10A to 10D, for each of the coils.

With reference to FIG. 2, the changing of the cross-sectional area for adjusting the self-inductance will be further concretely described by citing the L adjuster 12A as an example. As shown in FIG. 2, the portions extended in parallel between the bypassed path 121 and the bypassed path 122, namely, the coupling portion 111M and the coupling portion 112M are disposed so that a separation distance therebetween can be adjusted. Specifically, the coupling portions 111M, 112M are disposed in a vertically shiftable manner, and by vertically shifting the coupling portions 111M, 112M, the L adjuster 12A adjusts the cross-sectional area of the area S. Note that it is preferable that the coupling portions 111M, 112M are vertically shifted in a range of length of the extended standing portions 111C, 111B, 112C, 112B, and are vertically shifted so that a center point O of the area S is positioned at a center between the input/output terminals 111 and 112. Specifically, the coupling portions 111M, 112M are vertically shifted so that a shifting distance of the coupling portion 111M in the upward direction from a state where the coupling portion 111M is positioned on the lowermost end and is substantially parallel to the input/output terminal 111 (a state where the terminal is not bypassed) becomes almost equal to a shifting distance of the coupling portion 112M in the downward direction from a state where the coupling portion 112M is positioned on the uppermost end and is substantially parallel to the input/output terminal 112 (a state where the terminal is not bypassed).

Further, as a method of changing the cross-sectional area of each of the L adjusters 12A to 12D as described above, a method, other than the method of vertically shifting the coupling portions 111M, 112M to change a height of each of the L adjusters 12A to 12D, with which the standing portions 111C, 111B, 112C, 112B are shifted in parallel to change a width of each of the L adjusters 12A to 12D can also be employed. However, since the induction heating apparatus 1 is connected to, for instance, a bus bar, a matching device and the like, if the method of changing the width is employed, there is a need to change connecting positions between the apparatus and the bus bar, the matching device and the like, and a difficulty is high in designing the apparatus. On the other hand, in the method of changing the height, there is a limitation in a changeable height. However, when mutual inductance is generated between the L adjusters 12A to 12D as will be described hereinafter, the mutual inductances between the L adjusters 12A to 12D and the heating coils 10A to 10D can be geometrically separated, so that the adjustment of mutual inductance between the L adjusters is easily realized.

Note that in the present embodiment, the respective coupling portions 111M, 112M are electrically connected and engaged to be fixed to the standing portions 111C, 111B, 112C, 112B by an engaging unit such as a bolt, for instance.

Further, as a technique for adjusting inductance to change a voltage which, although is totally different in structure and is from another technical field, there can also be cited a furnace transformer for an electric arc furnace as disclosed in the aforementioned Patent Document 3, for instance. However, in the adjustment in the transformer, a distance between terminals of respective phases of a three-phase power source is changed and mutual inductance between the phases in one circuit is changed to adjust impedance in the circuit. On the other hand, the induction heating apparatus 1 according to the present embodiment adjusts self-inductance in one circuit, so that it has a totally different structure. Further, the induction heating apparatus 1 according to the present embodiment can make a mechanism for voltage adjustment compact as compared to a mechanism in Patent Document 3, by utilizing mutual reactance between respective circuits as will be described hereinbelow.

(Mutual Inductance)

Further, each of the L adjusters 12A to 12D is disposed along a direction orthogonal to an extending direction of the electrical pathway 11 (x-axis direction in FIG. 1). In other words, the respective L adjusters 12A to 12D are disposed so that center points O of areas S of the respective L adjusters 12A to 12D position on substantially the same line, as shown in FIG. 2. More concretely, the respective L adjusters 12A to 12D are disposed along the same direction as an arrangement direction of the heating coils 10A to 10D so that cross sections of the areas S become substantially parallel to one another, as shown in FIG. 1 and the like. Specifically, the standing portions 111C of the respective L adjusters 12A to 12D are bent to he formed so that they become parallel to one another. The other standing portions 111B, 112C, 112B are also formed in the same manner. Further, at this time, the respective L adjusters 12A to 12D are preferably arranged in a direction parallel to a plate-passing direction of the steel plate 2 (x-axis direction).

Further, each of the L adjusters 12A to 12D is disposed so that a space D2 between the mutually adjacent L adjusters 12A to 12D becomes 50 mm to 500 mm, as shown in FIG. 3.

As described above, by disposing the L adjusters 12A to 12D on the same line in parallel with the space D2 of 50 mm to 500 mm therebetween, mutual induction can be generated by generating mutual inductance between at least the mutually adjacent L adjusters 12A to 12D. By generating the mutual induction, each of the L adjusters 12A to 12D can enhance a reactance adjustment effect and efficiency in a circuit which is realized by the adjustment of self-inductance. Accordingly, it is possible to reduce an amount of adjustment of self-inductance performed by the L adjusters 12A to 12D. Specifically, it is possible to reduce the cross-sectional areas and the like of the L adjusters 12A to 12D to downsize the structure of the entire induction heating apparatus 1, which enables to make the apparatus compact.

Meanwhile, according to the voltage adjustment mechanism in the aforementioned Patent Document 3, for instance, there is a need to change the distance between the terminals of the respective phases by 900 mm or more to adjust impedance by about 40%. Such a voltage adjustment mechanism is difficult to be applied to the induction heating apparatus because the structure of the apparatus is enlarged and, in addition to that, the apparatus needs to be connected to, for example, a bus bar, a matching device and the like, and thus a layout therein is hard to be changed. On the other hand, the induction heating apparatus 1 according to the present embodiment can be made compact by performing the adjustment of self-inductance through only the height adjustment of the L adjusters 12A to 12D as described above, and besides, it is possible to make the L adjusters 12A to 12D further compact by utilizing the mutual inductance. Accordingly, the voltage adjustment mechanism included in the induction heating apparatus 1 according to the present embodiment is very compact compared to the voltage adjustment mechanism disclosed in Patent Document 3, and it is possible to miniaturize the structure of the entire apparatus.

Note that if the space D2 between the adjacent L adjusters 12A to 12D is less than 50 mm, when a high-frequency alternating voltage is applied, a discharge may occur between the adjacent L adjusters 12A to 12D. Further, if the space D2 between the adjacent L adjusters 12A to 12D is more than 500 mm, the mutual inductance between the adjacent L adjusters 12A to 12D is reduced.

Description regarding relative disposed positions of the L adjusters 12A to 12D will be made as follows, in terms of the mutual inductance. By disposing the respective L adjusters 12A to 12D as described above, it is possible to adjust the mutual inductance between the mutually adjacent L adjusters 12A to 12D to 5 to 30% of the self-inductance of each of the L adjusters 12A to 12D. Note that if the mutual inductance is greater than 30% of the self-inductance, a current change amount of the heating coils 10A to 10D is too large with respect to an area change of one of the L adjusters 12A to 12D. Specifically, in this case, since the L adjusters 12A to 12D are adjusted too precisely, a highly accurate adjustment (adjustment in a unit of 1 mm) is required to control the rate of heating. Therefore, it becomes difficult to control the rate of heating. Further, if the mutual inductance is less than 5% of the self-inductance, a current change amount of the heating coils 10A to 10D is too small with respect to an area change of one of the L adjusters 12A to 12D, which makes it difficult to downsize the L adjusters 12A to 12D.

Note that in this case, the mutual inductance between the L adjusters 12A to 12D can be schematically determined by a ratio of the area change of the L adjusters 12A to 12D with respect to the heating coils 10A to 10D and a ratio of the change in current flowing through the heating coils 10A to 10D. Specifically, if a value obtained by dividing the ratio of the change in current by the ratio of the area change is 1.2, an amount of increase in the value (0.2) corresponds to the mutual inductance. Accordingly, in this case, it is possible to calculate that the mutual inductance is 20% of the self-inductance of the L adjusters 12A to 12D.

(Relationship Between Heating Coil and L Adjuster)

Further, the L adjusters 12A to 12D are disposed so that a space D3 between the respective heating coils 10A to 10D and the respective L adjusters 12A to 12D connected thereto becomes 500 mm to 2000 mm. By disposing the L adjusters 12A to 12D with the space D3 therebetween, it is possible to conduct the inductance adjustment performed by the L adjusters 12A to 12D in an easier and more stable manner. Specifically, if the space D3 is less than 500 mm, a magnetic field generated in the L adjusters 12A to 12D interferes with the heating coils 10A to 10D, resulting in that the mutual inductance is generated between the L adjusters and the heating coils. Therefore, it becomes difficult to adjust the L adjusters 12A to 12D. Meanwhile, an upper limit 2000 mm of the space D3 is determined based on a value of impedance of the entire circuit including the heating coils 10A to 10D and the L adjusters 12A to 12D and capable of securing a withstand voltage to ground. Namely, if the space D3 is more than 2000 mm, the structure of the entire apparatus becomes large, which not only prevents the downsizing of the apparatus but also increases the impedance of the entire circuit, resulting in that a potential difference among the coils is increased and a discharge becomes easy to occur.

Further, although depending also on a size of the steel plate 2, a width of the L adjusters 12A to 12D in a plate width direction of the steel plate (y-axis direction) is preferably set to, for example, 500 to 2500 mm (about 30 to 50% of a width of the heating coils 10A to 10D), and a height of the L adjusters 12A to 12D in a plate thickness direction of the steel plate 2 (z-axis direction) is preferably set to, for example, 100 to 200 mm (about 20 to 200% of a height of the heating coils 10A to 10D). In other words, a size of the L adjusters 12A to 12D is preferably set to satisfy the condition of (area of heating coil+area of L adjuster)/area of heating coil=1 to 3. Further, a width of the L adjusters 12A to 12D in the plate-passing direction J1 of the steel plate 2 is set to be substantially the same as that of the heating coils 10A to 10D.

(Example of Effect of L Adjuster)

The L adjusters 12A to 12D structured as above can not only make the entire apparatus compact, but also adjust a current amount of each of the heating coils 10A to 10D. When the current amount is adjusted, the L adjusters 12A to 12D create no energy loss due to the generation of the Joule heat since they do not use resistors as in the aforementioned Patent Document 2, so that the induction heating apparatus 1 according to the present embodiment can improve energy efficiency. Further, since each of the L adjusters 12A to 12D can adjust the self-inductance, it is easy to adjust the heating of the steel plate 2 by adjusting the self-inductance in accordance with, for example, a material, a plate thickness, a plate width and the like of the steel plate 2.

(Adjustment Method of L Adjuster)

Further, the induction heating apparatus 1 according to the present embodiment can keep a constant rate of heating also in the vicinity of the Curie point by adjusting the areas of the L adjusters 12A to 12D to adjust not only the self-inductance but also the mutual inductance. The area adjustment of the L adjusters 12A to 12D at the time of keeping the rate of heating constant in a high temperature range will be described hereinbelow. Note that it goes without saying that the rate of heating in the vicinity of the Curie point can be kept constant by not only the area adjustment of the L adjusters 12A to 12D to be described hereinbelow but also operations of the aforementioned respective structures and the like.

Figure 5:
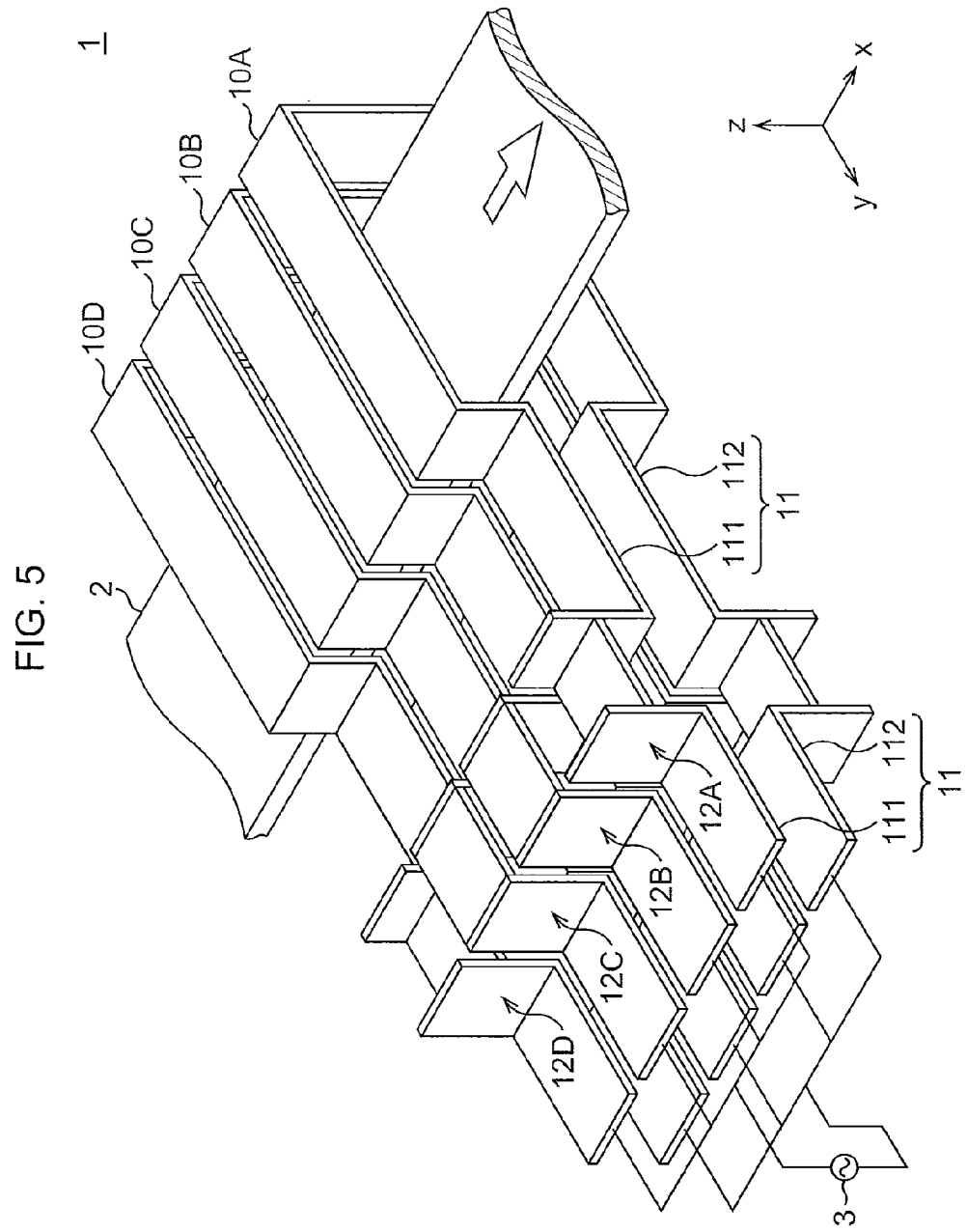
FIG. 5 is an explanatory diagram for explaining an adjustment method of L adjusters in the induction heating apparatus according to the same embodiment.

As shown in FIG. 5, the L adjusters 12A to 12D are adjusted to make the self-inductance generated in the L adjusters 12D, 12A which are respectively connected to the heating coil 10D at the first stage and the heating coil 10A at the last stage in the longitudinal direction of the steel plate 2, smaller than the self-inductance generated in the L adjusters 12C, 12B between the L adjusters 12D and 12A.

More concretely, the L adjusters 12A to 12D are adjusted to make the cross-sectional areas in the areas S of the L adjusters 12D, 12A smaller than the cross-sectional areas in the areas S of the L adjusters 12C, 12B. In other words, the L adjusters 12A to 12D are adjusted to make the separation distance between the coupling portions 111M and 112M in each of the L adjusters 12D, 12A smaller than the separation distance between the coupling portions 111M and 112M in each of the L adjusters 12C, 12B. If the above is described in terms of the height of the L adjusters 12A to 12D, the height of the L adjusters 12D, 12A becomes smaller than that of the L adjusters 12B, 12C.

If such a structure is employed, reactance in a circuit in which each of the L adjusters 12D, 12A is disposed becomes smaller than that in another circuit, resulting in that a large current can be flown through the heating coils 10D, 10A, compared to a current flown through the heating coils 10C, 10B. By increasing a current amount provided to the heating coils 10D, 10A at the first stage and the last stage as above, it is possible to increase the heating densities on the steel plate 2 corresponding to the heating coils 10D, 10A, and to keep the rate of heating of the steel plate 2 in the vicinity of the Curie point constant.

Examples

Examples regarding a change in the current amount and the heating density caused by the adjustment of the L adjusters 12A to 12D will be shown. In the examples according to the present embodiment, a width (width in the y-axis direction in FIG. 1) and a height (length in the z-axis direction in FIG. 1, distance W1 in FIG. 2) of the heating coils 10A to 10D are set to 1000 mm and 400 mm, respectively, a coil length of each of the heating coils 10A to 10D is set to 100 mm, and a mutual distance D1 of the mutually adjacent heating coils 10A to 10D is set to 50 mm (namely, in this case, the mutual distance D1 of the mutually adjacent heating coils 10A to 10D is 1/8 times of the inside diameter W1 in the height direction of the heating coils 10A to 10D). Further, a width (width in the y-axis direction in FIG. 1) of the L adjusters 12A to 120 is set to 400 mm, and a height (length in the z-axis direction in FIG. 1) thereof is changed from 0 mm (space between the input/output terminals 111 and 112) to 300 mm.

Figure 6:
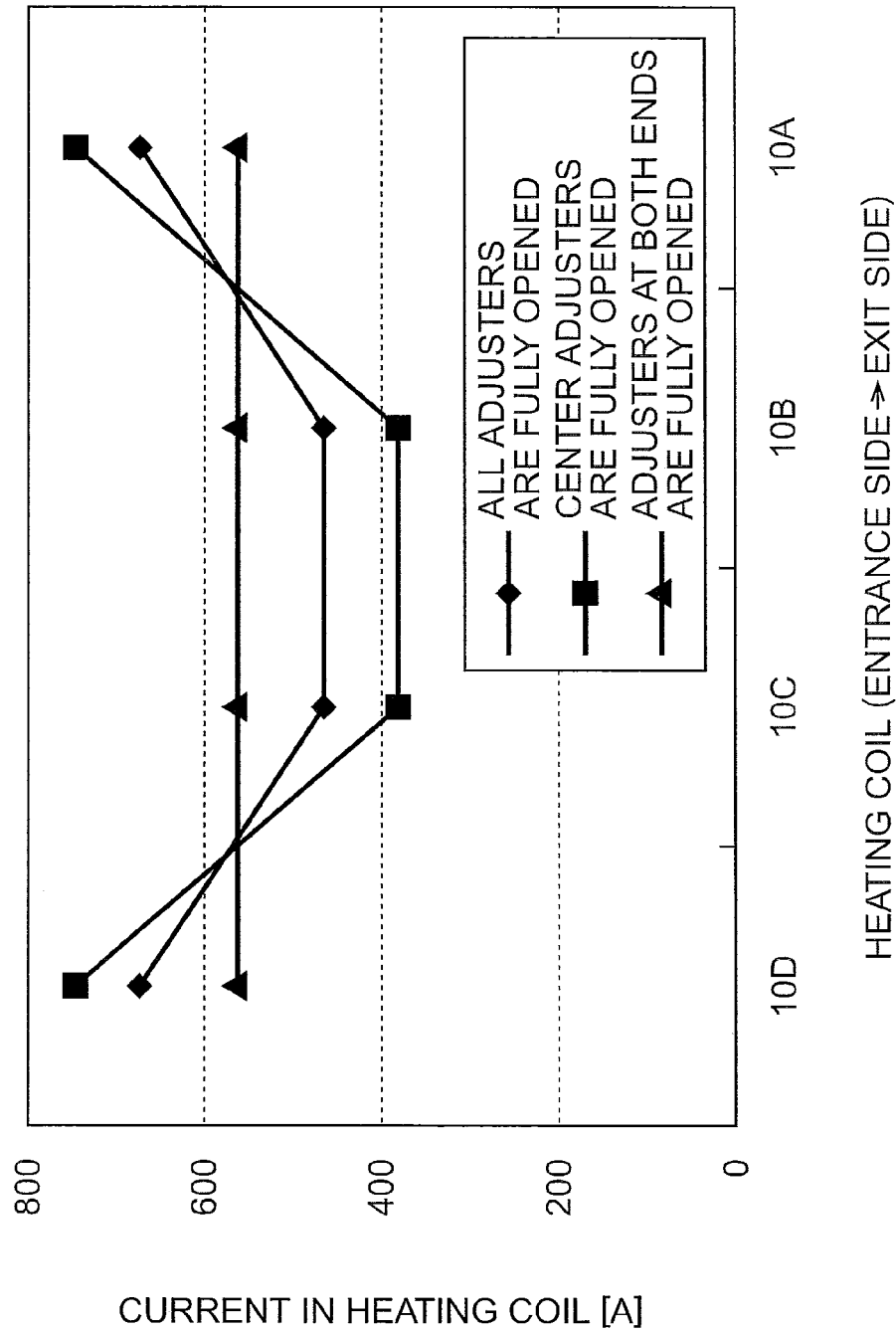
FIG. 6 is a graph showing an amount of current flowing through the heating coils when the L adjusters are adjusted in the induction heating apparatus according to the same embodiment.

A change in current, at this time, flowing through the heating coils 10A to 10D corresponding to the L adjusters 12A to 12D as a result of adjusting the areas of the L adjusters is shown in FIG. 6. Note that in FIG. 6, a horizontal axis indicates the respective heating coils 10D, 10C, 10B, 10A, and a vertical axis indicates a current flowing through the respective heating coils. Further, "fully opened" indicates a case where the L adjuster is opened, namely, the coupling portion 111M is positioned on the uppermost end and the coupling portion 112M is positioned on the lowermost end to maximize the cross-sectional area of the area S of the L adjuster. Concretely, in the case of this example, a state where the height of the L adjuster (distance between the coupling portions 111M and 112M) is set to 300 mm is indicated. Note that "fully closed" having an opposite meaning to "fully opened" indicates a case where the L adjuster is closed, namely, the coupling portion 111M is positioned on the lowermost end to be disposed on the line of the input/output terminal 111 and the coupling portion 112M is positioned on the uppermost end to be disposed on the line of the input/output terminal 112. Concretely, in the case of this example, a state where the height of the L adjuster is set to 0 mm (space between the input/output terminals 111 and 112) is indicated.

As shown in FIG. 6, when all the adjusters are fully opened, namely, the L adjusters 12A to 12D are fully opened, the current amount in the heating coils 10A, 10D at the first and the last stages is increased. In this case, since the L adjusters 12A to 12D are formed by bypassing the electrical pathways 11 and due to an influence of mutual inductance described above as a result of approximately disposing the heating coils 10A to 10D, it is possible to increase the current amount in the heating coils 10A, 10D at both ends. Specifically, the inductance in the heating coils 10A, 10D at both ends becomes smaller than the inductance in the heating coils 10B, 10C between the heating coils 10A and 10D, resulting in that the current amount in the heating coils 10A, 10D at both ends can be increased.

Meanwhile, when the center adjusters are fully opened, namely, the L adjusters 12A, 12D at both ends are fully closed and the center L adjusters 12B, 12C between the L adjusters 12A and 12D are fully opened, the current amount in the heating coils 10A, 10D at the first and the last stages is further increased. In this case, because of the inductance generated in the center L adjusters 12B, 12C, the current flowing through the heating coils 10B, 10C connected to the L adjusters 12B, 12C is decreased. Further, because of the mutual inductance between the L adjusters 12A to 12D and the mutual inductance between the heating coils 10A to 10D, the amount of current flowing through the heating coils 10A, 10D at both ends can be increased.

On the other hand, when the L adjusters at both ends are fully opened, namely, the L adjusters 12A, 12D at both ends are fully opened and the center L adjusters 12B, 12C between the L adjusters 12A and 12D are fully closed, a difference in the current amount in the heating coils 10A to 10D is decreased, and substantially the same current is flown through the heating coils 10A to 10D. In this case, because of the inductance generated in the L adjusters 12A, 12D at both ends, the current flowing through the heating coils 10A, 10D connected to the L adjusters 12A, 12D is decreased. However, because of the mutual inductance between the L adjusters 12A to 12D and the mutual inductance between the heating coils 10A to 10D, the amount of current flowing through the center heating coils 10B, 10C can be increased. As a result of this, it is possible to adjust the current flowing through the respective heating coils 10A to 10D to be substantially constant.

The change in the current amount in the heating coils 10A to 10D provided by the height adjustment of the L adjusters 12A to 12D as described above exhibits the same tendency also when the mutual distance D1 of the mutually adjacent heating coils 10A to 10D is changed to be not less than 1/10 times nor more than 1/3 times of the inside diameter W1 in the height direction of the heating coils 10A to 10D and the width of the heating coils 10A to 10D is changed to be 1000 mm, 1500 mm, and 2000 mm.

In this case, when the center adjusters are fully opened, the rate of heating in all temperature ranges can be further uniformized. This will be described with reference to FIG. 7 to FIG. 9.

(Center Adjusters are Fully Opened)

Figure 7A:
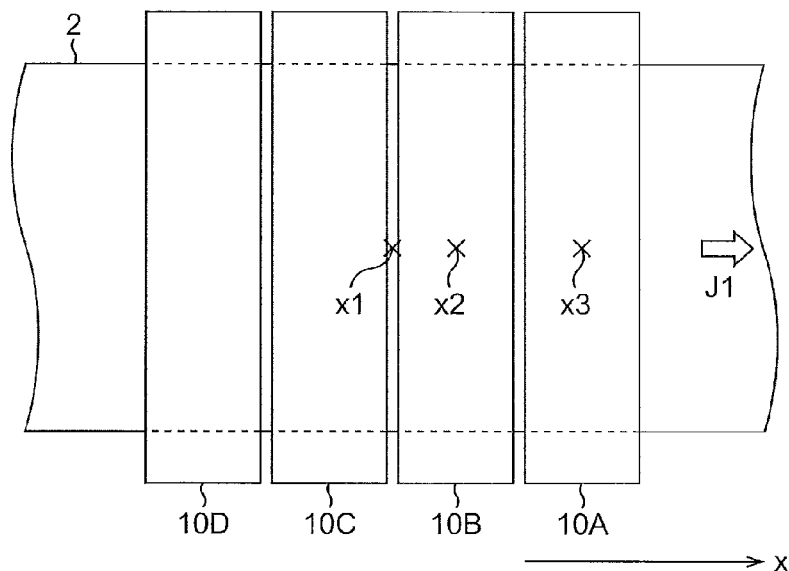
FIG. 7A is an explanatory diagram for schematically explaining a rate of heating in a longitudinal direction of the steel plate obtained by the induction heating apparatus according to the same embodiment.
Figure 7B:
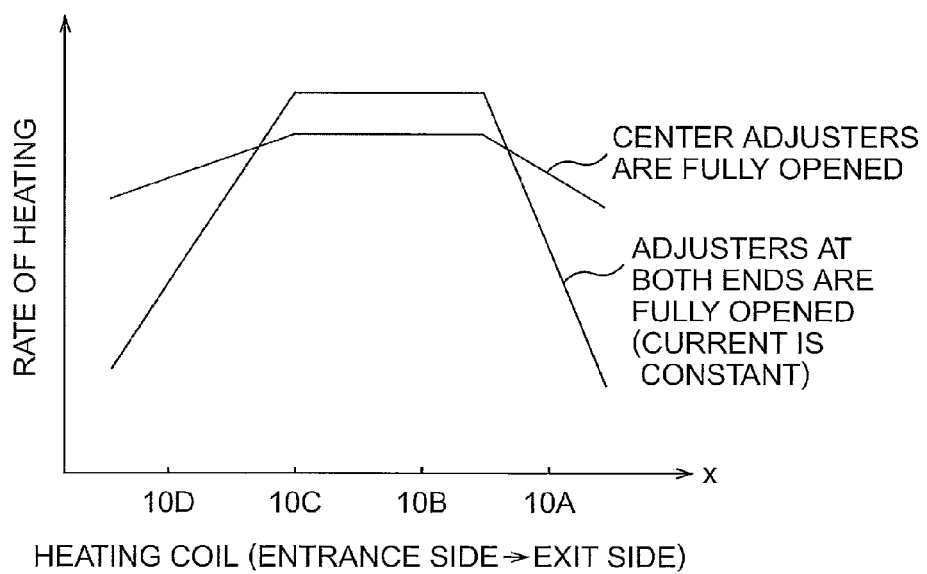
FIG. 7B is a graph showing a rate of heating in the longitudinal direction of the steel plate obtained by the induction heating apparatus according to the same embodiment.
Figure 8:
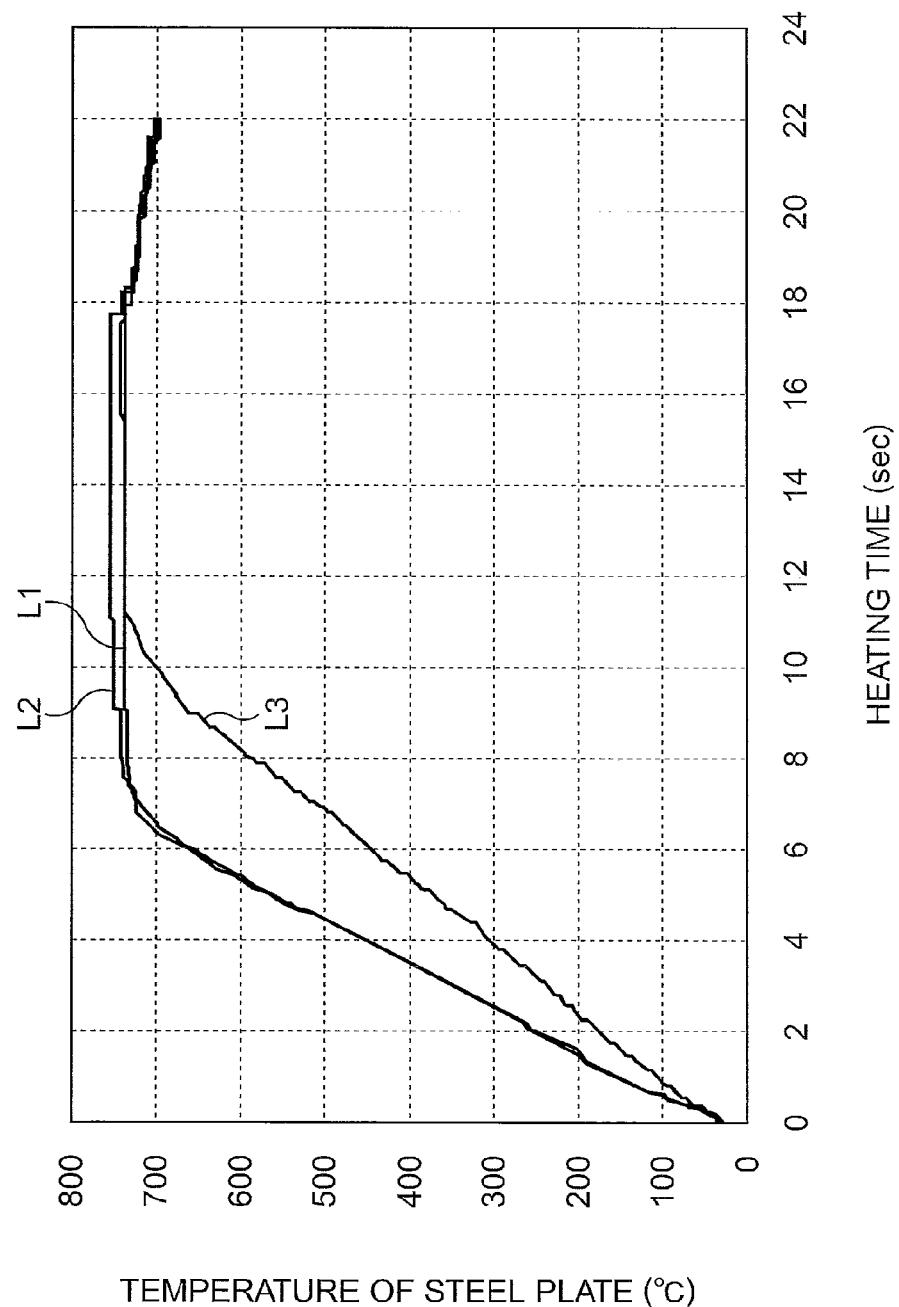
FIG. 8 is a graph showing a rate of heating when adjusters at both ends are fully opened.
Figure 9:
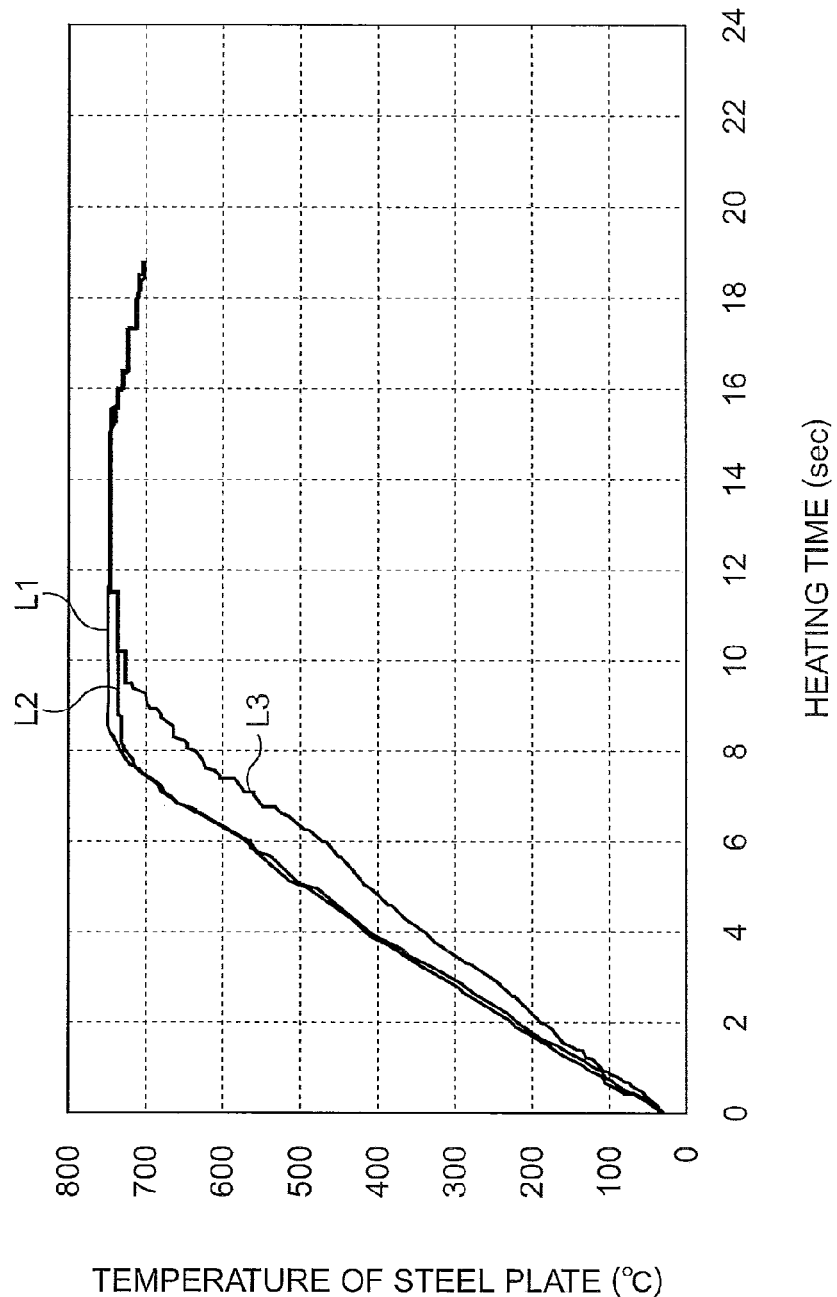
FIG. 9 is a graph showing a rate of heating when center adjusters are fully opened.

FIG. 7 are explanatory diagrams for schematically explaining a rate of heating in the longitudinal direction of the steel plate 2 obtained by the induction heating apparatus 1 according to the present embodiment, FIG. 8 is a graph showing a rate of heating when adjusters at both ends are fully opened, and FIG. 9 is a graph showing a rate of heating when center adjusters are fully opened.

Positions x1, x2, x3 of the steel plate 2 in the longitudinal direction shown in FIG. 7A indicate a center of the heating coil 10A to the heating coil 10D, a position 100 mm behind x1 (center of the heating coil 10B), and a position 300 mm behind x3 (center of the heating coil 10A), respectively. Further, measured values L1, L2, L3 shown in FIG. 8 and FIG. 9 indicate temperature changes of the steel plate 2 at the positions x1, x2, x3, respectively.

As shown in FIG. 8, when the adjusters at both ends are fully opened to set the amount of current flowing through the respective heating coils 10A to 10D to be constant, the rate of heating at the position x3 (inclination of L3) becomes smaller than the rate of heating at the positions x1, x2 (inclination of L1, L2). This is because the temperature of the steel plate 2 reaches a high temperature range in the vicinity (about 650° C., for instance) of the Curie point (about 770° C., for instance) and the magnetic permeability of the steel plate 2 is decreased, which results in decreasing the rate of heating. Meanwhile, as shown in FIG. 9, when the center adjusters are fully opened to increase the amount of current flowing through the heating coils 10A, 10D at both ends, the rate of heating at the position x3 (inclination of L3) is approximated to the rate of heating at the positions x1, x2 (inclination of L1, L2) by about 100° C./s. Accordingly, it is possible to reduce the decrease in the rate of heating of the steel plate 2 in the temperature range in the vicinity of the Curie point.

The rate of heating of the steel plate 2 in this case will be schematically described throughout the induction heating apparatus 1 as follows.

Specifically, as shown in FIG. 7B, when both ends of the L adjusters 12A to 12D are fully opened to set the current constant, the heating coil 10D on an entrance side of the steel plate 2 cannot obtain a heating density which is required at the time of starting the heating, and thus the rate of heating is decreased. Meanwhile, the rate of heating is decreased in the heating coil 10A on an exit side since the temperature of the steel plate 2 reaches the high temperature range and thus the magnetic permeability is decreased. On the contrary, if the L adjusters 12A to 12D at the center are fully opened, the current amount in the center heating coils 10B, 10C is decreased to decrease the rate of heating, but, the current amount in the heating coils 10A, 10D at both ends is increased, which enables to increase the rate of heating. At this time, the decrease in the rate of heating in the center heating coils 10B, 10C has an influence less than that of an effect obtained by increasing the rate of heating in the heating coils 10A, 10D at both ends. This is because the mutual reactance acts between the L adjusters 12A to 12D.

Specifically, when the center adjusters are fully opened, a large current can be flown through the heating coils 10A, 10D at both ends, compared to a current flown through the center heating coils 10B, 10C, and it is possible to reduce the change in the rate of heating. Note that in order to realize such a rate of heating, the induction heating apparatus 1 according to the present embodiment uses a coil current of about 3000 A at maximum. Meanwhile, according to the aforementioned Patent Document in which variable resistors are used, for example, a current of about 4500 A is required if values of the respective coil voltages are set to be the same. Specifically, with the use of the induction heating apparatus 1 according to the present embodiment, about 33% of energy can be reduced in power consumption. An amount of the reduction corresponds to household power consumption in about several thousands of homes. Further, the energy reduction is achieved largely because of an effect of mutual inductance between the L adjusters 12A to 12D, and even if the variable capacitors are used as in Patent Document 1, for instance, it is difficult to realize such an energy reduction.

Figure 10:
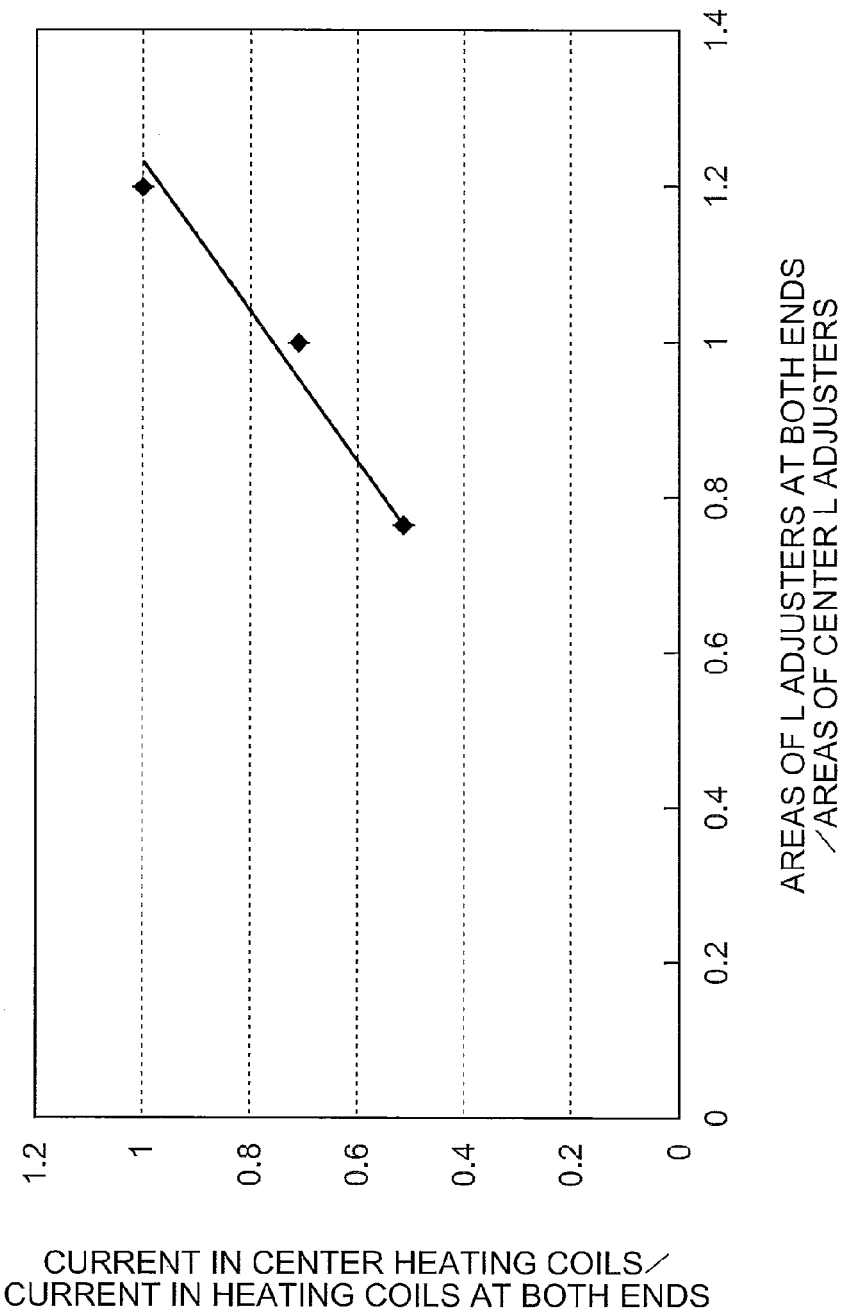
FIG. 10 is a graph showing a current ratio of the heating coils with respect to an area ratio of the L adjusters.

This will be examined based on an area ratio of the L adjusters 12A to 12D with reference to FIG. 10.

FIG. 10 is a graph showing a current ratio of the heating coils 10A to 10D with respect to the area ratio of the L adjusters 12A to 12D.

Note that in FIG. 10, a horizontal axis indicates a ratio of areas of the L adjusters 12A, 12D at both ends with respect to areas of the center L adjusters 12B, 12C, and a vertical axis indicates a ratio of current flowing through the center heating coils 10B, 10C with respect to current flowing through the heating coils 10A, 10D at both ends. Further, in this case, if the horizontal axis and the vertical axis are respectively set as x and y, an approximate straight line of respective measurement points is represented by y=1.22x−0.50.

As shown in FIG. 10, by changing the area ratio of the L adjusters, it is possible to change the current ratio of the heating coils. Concretely, if the areas of the center L adjusters 12B, 12C and the areas of the L adjusters 12A, 12D at both ends are equalized (if the area ratio is set as 1), the current flowing through the heating coils 10A, 10D at both ends becomes larger than the current flowing through the center heating coils 10B, 10C. Meanwhile, if the areas of the center L adjusters 12B, 12C are sell to be larger than the areas of the L adjusters 12A, 12D at both ends (if the area ratio is set as 0.8, for instance), the current flowing through the heating coils 10A, 10D at both ends further increases to be about twice the current flowing through the center heating coils 10B, 10C (the current ratio becomes about 0.5). On the other hand, if the areas of the center L adjusters 12B, 12C are set to be smaller than the areas of the L adjusters 12A, 12D at both ends (if the area ratio is set as 1.2, for instance), the current flowing through the heating coils 10A, 10C at both ends decreases to be substantially equal to the current flowing through the center heating coils 10B, 10C (the current ratio becomes about 1).

Specifically, when the area ratio is increased about 1.5 times from 0.8 to 1.2, the current can be increased about twice from 0.5 to 1.0. Namely, it can be seen that by changing the areas of the L adjusters 12A to 12D, the current amount can be effectively controlled. This is because the L adjusters 12A to 12D generate not only the self-inductance but also the mutual inductance therebetween.

(Frequency of Applied Voltage)

Figure 11:
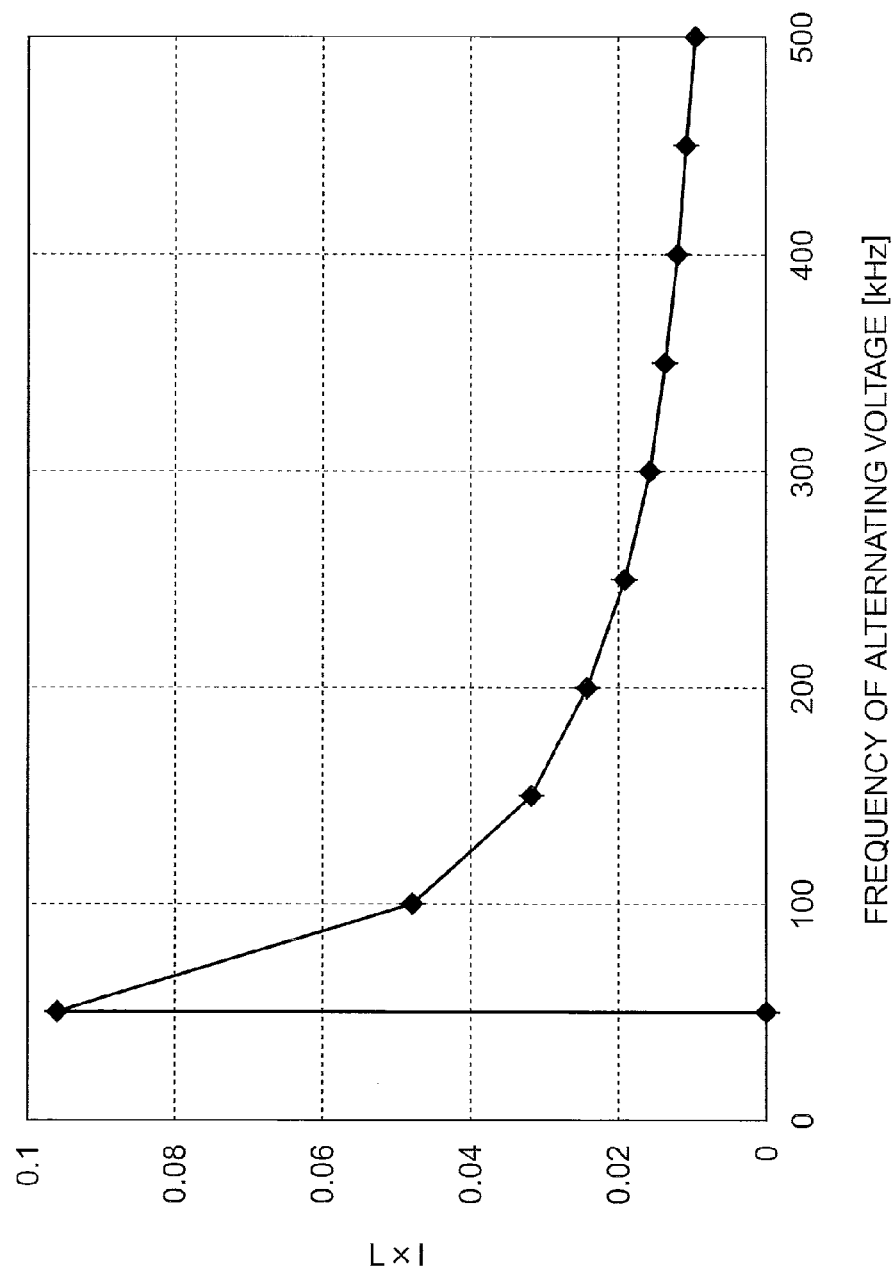
FIG. 11 is a graph showing an alternating voltage with respect to a frequency of alternating voltage of an AC power source.

Next, a frequency (also referred to as operating frequency) of alternating voltage applied to the induction heating apparatus 1 including the L adjusters 12A to 12D according to the present embodiment will be described with reference to FIG. 11. FIG. 11 is a graph showing an alternating voltage with respect to a frequency of alternating voltage of the AC power source 3.

A current I to be flown through the heating coils 10A to 10D is determined based on an applied range of heating/rate of heating and the like of the steel plate 2 to be heated. By the current and a frequency thereof (frequency of voltage) and inductance generated by the respective coils and the bus bar and the like, there are generated coil voltages of the heating coils 10A to 10D and a voltage between the heating coils and the bus bar. A restriction represented by the following (mathematical expression 1) is imposed on the coil voltage because of an allowable voltage, a supply voltage or the like of the apparatus.

(Mathematical Expression 1)

coil voltage$[V] = 2 \times \pi \times$(operating frequency $f$[Hz])$\times$ (inductance of coil $L$ [$H$])$\times$coil current $I$[A] (mathematical expression 1)

Because of the restriction of the (mathematical expression 1), the relation between the operating frequency f and L×I (namely, coil voltage) is represented by the graph in FIG. 11.

Meanwhile, a range of the inductance of each of the coils has to be determined based on the withstand voltage to ground, the coil current I and the operating frequency f. Accordingly, in order to adjust the inductance of the L adjusters 12A to 12D as described above, the operating frequency f is preferably set to fall within a range of 50 kHz to 500 kHz, for instance. If the operating frequency is in a range of 50 kHz to 500 kHz, the inductance provided by the coils including the L adjusters 12A to 12D occupies 99% or more of the entire inductance, so that it is possible to adjust the current flowing through the respective heating coils 10A to 10D using the L adjusters 12A to 12D, while reducing the influence of load of the steel plate 2 as a core.

Note that if the operating frequency f is less than 50 kHz, there is an influence of resistance of the steel plate 2 as a core, which results in reducing the effect of adjustment of current provided by the L adjusters 12A to 12D. On the other hand, if the operating frequency f is more than 500 kHz, a margin of the withstand voltage to ground becomes narrow with respect to the change in the inductance provided by the L adjusters 12A to 12D, resulting in that the range of height adjustment of the L adjusters 12A to 12D is limited to a narrow range and it becomes difficult to appropriately adjust the current.

Although the preferred embodiments of the present invention have been specifically described above with reference to the attached drawings, it is needless to say that the present invention is not limited to such examples. Those who have ordinary knowledge of the technical field to which the present invention belongs can obviously conceive various modified examples or revised examples within the scope of the technical idea described in Claims, and it is understood that these examples belong to the technical range of the present invention as a matter of course.

For example, although the aforementioned embodiment uses a bolt, for instance, as the engaging unit of the coupling portions 111M, 112M in the L adjusters 12A to 12D, the present invention is not limited to such an example. For instance, the engaging unit is only required to be able to electrically connect the coupling portion and the standing portions, and a latch or the like, for instance, can also be used. When the latch or the like is used, it is possible to release an engaging state by disengaging the latch using a driving unit such as a motor, for example, and it is also possible to vertically shift the coupling portions 111M, 112M automatically using another driving unit. In this case, for instance, it is also possible to vertically shift the coupling portions 111M, 112M automatically to realize a desired rate of heating and the like by measuring a current amount in each of the heating coils 10A to 10D, a temperature of the steel plate 2 at a corresponding position, and the like.

INDUSTRIAL APPLICABILITY

According to the present invention, it is possible to reduce a change in a rate of heating for heating a steel plate while improving energy efficiency.

What is claimed is:

1. An induction heating apparatus which continuously heats a steel plate using a solenoid system, the apparatus comprising:
at least three heating coils disposed along a longitudinal direction of the steel plate to make the steel plate pass through an inside thereof; and
inductance adjusters capable of generating self-induction and adjusting self-inductance in the self-induction, wherein said inductance adjusters are disposed on electrical pathways electrically connecting each of said heating coils and a power source which applies a voltage to each of said heating coils, wherein:
each of said heating coils has one inductance adjuster, and
each of said inductance adjusters is disposed to cause a generation of mutual induction at least between said inductance adjusters mutually adjacent to one another.

2. The induction heating apparatus according to claim 1, wherein
the self-inductance generated by each of said inductance adjusters provided to said heating coil at a first stage and said heating coil at a last stage in the longitudinal direction of the steel plate is adjusted to be smaller than the self-inductance generated by said inductance adjuster for said heating coil disposed between said heating coil at the first stage and said heating coil at the last stage.

3. The induction heating apparatus according to claim 2, wherein:
a mutual distance of said heating coils mutually adjacent to one another is not less than $\frac{1}{10}$ nor more than $\frac{1}{3}$ of an inside diameter in a height direction of said heating coil;
each of said inductance adjusters is structured by forming bypassed paths in a direction orthogonal to the electrical pathway; and
a space between said mutually adjacent inductance adjusters is 50 mm to 500 mm.

4. The induction heating apparatus according to claim 3, wherein
each of said inductance adjusters generates the self-induction by bypassing the electrical pathway on which each of said inductance adjusters is disposed in a substantially coil shape, and adjusts the self-inductance in the self-induction by changing a cross-sectional area of an area surrounded by the substantially coil-shaped bypassed paths being the bypassed electrical pathway.

5. The induction heating apparatus according to claim 4, wherein:
each of the electrical pathways connecting each of said heating coils and the power source is formed of a pair of input/output terminals longly extended from each of said heating coils; and
said inductance adjuster is formed by bypassing the pair of input/output terminals to make one of the pair of input/output terminals and the other terminal separate from each other, and changes the cross-sectional area of the area surrounded by the bypassed paths by changing a distance between the one of the pair of input/output terminals and the other terminal in the bypassed paths.

6. The induction heating apparatus according to claim 5, wherein
a space between each of said heating coils and each of said inductance adjusters connected to each of said heating coils is 500 mm to 2000 mm.

7. The induction heating apparatus according to claim 6, wherein
each of said heating coils is a single-turn coil or a double-turn coil.

8. An induction heating method for continuously heating a steel plate using a solenoid system, the method comprising:
disposing at least three heating coils along a longitudinal direction of the steel plate to make the steel plate pass through an inside of the coils;
disposing inductance adjusters capable of generating self-induction and adjusting self-inductance in the self-induction on electrical pathways electrically connecting each of the heating coils and a power source applying a voltage to each of the heating coils, with respect to the respective heating coils, to cause a generation of mutual induction at least between the inductance adjusters mutually adjacent to one another; and
adjusting the self-inductance generated by each of the inductance adjusters provided to the heating coil at a first stage and the heating coil at a last stage in the longitudinal direction of the steel plate to be smaller than the self-inductance generated by the inductance adjuster for the heating coil disposed between the heating coil at the first stage and the heating coil at the last stage.

9. The induction heating method according to claim 8, wherein:
   a mutual distance of the heating coils mutually adjacent to one another is not less than 1/10 nor more than 1/3 of an inside diameter in a height direction of the heating coil;
   each of the inductance adjusters is structured by forming bypassed paths in a direction orthogonal to the electrical pathway; and
   a space between the mutually adjacent inductance adjusters is 50 mm to 500 mm.

10. The induction heating method according to claim 9, wherein
   each of the inductance adjusters generates the self-induction by bypassing the electrical pathway on which each of the inductance adjusters is disposed in a substantially coil shape, and adjusts the self-inductance in the self-induction by changing a cross-sectional area of an area surrounded by the substantially coil-shaped bypassed paths being the bypassed electrical pathway.

11. The induction heating method according to claim 10, wherein:
   each of the electrical pathways connecting each of the heating coils and the power source is formed of a pair of input/output terminals longly extended from each of the heating coils; and
   the inductance adjuster is formed by bypassing the pair of input/output terminals to make one of the pair of input/output terminals and the other terminal separate from each other, and changes the cross-sectional area of the area surrounded by the bypassed paths by changing a distance between the one of the pair of input/output terminals and the other terminal in the bypassed paths.

12. The induction heating method according to claim 11, wherein
   a space between each of the heating coils and each of the inductance adjusters connected to each of the heating coils is 500 mm to 2000 mm.

13. The induction heating method according to claim 12, wherein
   each of the heating coils is a single-turn coil or a double-turn coil.

* * * * *